United States Patent
Liu et al.

(10) Patent No.: US 6,905,303 B2
(45) Date of Patent: Jun. 14, 2005

(54) METHODS AND APPARATUS FOR ASSEMBLING GAS TURBINE ENGINES

(75) Inventors: Hsin-tuan Liu, West Chester, OH (US); William Andrew Bailey, Cincinnati, OH (US); John Doane Niedermeier, Loveland, OH (US)

(73) Assignee: General Electric Company, Schenectady, NY (US)

( * ) Notice: Subject to any disclaimer, the term of this patent is extended or adjusted under 35 U.S.C. 154(b) by 54 days.

(21) Appl. No.: 10/610,130

(22) Filed: Jun. 30, 2003

(65) Prior Publication Data

US 2004/0265124 A1 Dec. 30, 2004

(51) Int. Cl.$^7$ .............................................. F01D 9/04
(52) U.S. Cl. ................ 415/142; 415/194; 415/195; 415/208.2; 415/209.1; 415/211.2; 29/889.22
(58) Field of Search ................ 415/142, 194, 415/195, 200.2, 211.2, 209.1; 29/889.22

(56) References Cited

U.S. PATENT DOCUMENTS

| | | | |
|---|---|---|---|
| 1,534,721 A | | 4/1925 | Lasche |
| 3,006,603 A | | 10/1961 | Caruso et al. |
| 3,169,747 A | * | 2/1965 | Seymour ............... 415/195 |
| 4,492,518 A | * | 1/1985 | Neal ...................... 415/142 |
| 4,874,287 A | * | 10/1989 | Grieb .................... 415/149.2 |
| 4,989,406 A | | 2/1991 | Vdoviak et al. |
| 5,249,921 A | | 10/1993 | Stueber et al. |
| 5,984,631 A | * | 11/1999 | Tolgos ................... 415/195 |
| 6,139,259 A | * | 10/2000 | Ho et al. ............... 415/119 |
| 6,371,725 B1 | | 4/2002 | Manteiga et al. |
| 6,439,838 B1 | * | 8/2002 | Crall et al. ............. 415/195 |
| 6,554,569 B2 | | 4/2003 | Decker et al. |
| 6,789,998 B2 | * | 9/2004 | Chen et al. ............ 415/208.2 |
| 2002/0182058 A1 | * | 12/2002 | Darnell et al. ......... 415/142 |
| 2003/0152459 A1 | * | 8/2003 | Gliebe .................. 415/211.2 |

FOREIGN PATENT DOCUMENTS

EP 1111191 A2 6/2001

OTHER PUBLICATIONS

European Patent Office Search Report; 132278/10091; 04253926.2–2315–; General Electric Company; 3 pgs.

* cited by examiner

*Primary Examiner*—Christopher Verdier
(74) *Attorney, Agent, or Firm*—Armstrong Teasdale LLP; William Scott Andes

(57) ABSTRACT

A method of assembling a gas turbine engine includes coupling an inner engine casing to an outer engine casing such that an annular flow path is defined therebetween, coupling a plurality of circumferentially-spaced support struts between the inner and outer casings, and coupling a plurality of circumferentially-spaced outlet guide vanes within the flow path upstream from the support struts, such that a first circumferential spacing is defined between a first guide vane and a second guide vane, and a second circumferential spacing is defined between the second guide vane and a third guide vane. The guide vanes are arranged such that the second guide vane is between the first and third guide vanes and the second circumferential spacing is different from the first circumferential spacing.

15 Claims, 6 Drawing Sheets

METHODS AND APPARATUS FOR ASSEMBLING GAS TURBINE ENGINES

BACKGROUND OF THE INVENTION

This invention relates generally to gas turbine engines, and more specifically to guide vane assemblies used with gas turbine engines.

Gas turbine engines typically include a compression system, which may consist of a single compressor or multiple compressors rotating at different speeds, for compressing a working fluid, such as air. The compressed air is channeled into a combustor wherein it is mixed with fuel and ignited to generate combustion gases which are channeled to a turbine. The turbine extracts energy from the combustion gasses to power the compressor, as well as to produce useful work to propel an aircraft in flight, or power a load, such as an electrical generator or a ship propeller.

Many known compressors include an outlet guide vane assembly. Outlet guide vanes have airfoil-like cross sections. Known outlet guide vane (OGV) assemblies include a plurality of circumferentially spaced vanes that are spaced substantially uniformly around the compressor outlet. Known OGV assemblies also include a plurality of struts which provide structural support to the compression system and the OGV assemblies.

During operation, blockage created by the struts may induce a non-uniform flow field upstream of the strut and produce a local high pressure area in the vicinity of each strut leading edge which may adversely affect engine operations. Furthermore, within at least some known gas turbine engines, when variable bleed valve (VBV) doors are opened, the non-uniformity of the flow field pressure increases and the affected area expands further upstream. Additional stresses may be induced to a row of rotor blades immediately upstream from the outlet guide vane assemblies.

To facilitate reducing stresses to the rotor assemblies, at least some known engines restrict the operation of the VBV doors. To facilitate maintaining the stresses below predetermined limits, other known engines change the ratio of the vanes to the struts, increase the flow direction spacing between the outlet guide vane and the strut, and/or use a plurality of differently shaped outlet guide vanes.

BRIEF DESCRIPTION OF THE INVENTION

In one aspect of the invention, a method of assembling a gas turbine engine is provided that includes coupling an inner engine casing to an outer engine casing such that an annular flow path is defined therebetween, coupling a plurality of circumferentially-spaced support struts between the inner and outer casings, and coupling a plurality of circumferentially-spaced outlet guide vanes within the flow path upstream from the support struts, such that a first circumferential spacing is defined between a first guide vane and a second guide vane, and a second circumferential spacing is defined between the second guide vane and a third guide vane. The guide vanes are arranged such that the second guide vane is between the first and third guide vanes and the second circumferential spacing is different from the first circumferential spacing.

In another aspect of the invention, a guide vane assembly for a gas turbine engine is provided. The guide vane assembly includes a plurality of circumferentially-spaced guide vanes including at least a first, a second, and a third guide vane. The second guide vane is positioned between the first and third guide vanes. The plurality of guide vanes is oriented such that a first circumferential spacing is defined between the first and second guide vanes and a second circumferential spacing is defined between the second and third guide vanes. The second circumferential spacing is different from the first circumferential spacing.

In another aspect of the invention, a gas turbine engine is provided that includes an annular compressor discharge flow path bounded by inner and outer engine casings and a plurality of circumferentially-spaced guide vanes disposed within the flow path. The plurality of guide vanes includes at least a first, a second, and a third guide vane. The second guide vane is positioned between the first and third guide vanes. The plurality of guide vanes is oriented such that a first circumferential spacing is defined between the first and second guide vanes and a second circumferential spacing is defined between the second and third guide vanes, and the second circumferential spacing is different from the first circumferential spacing.

DETAILED DESCRIPTION OF THE INVENTION

Figure 1:
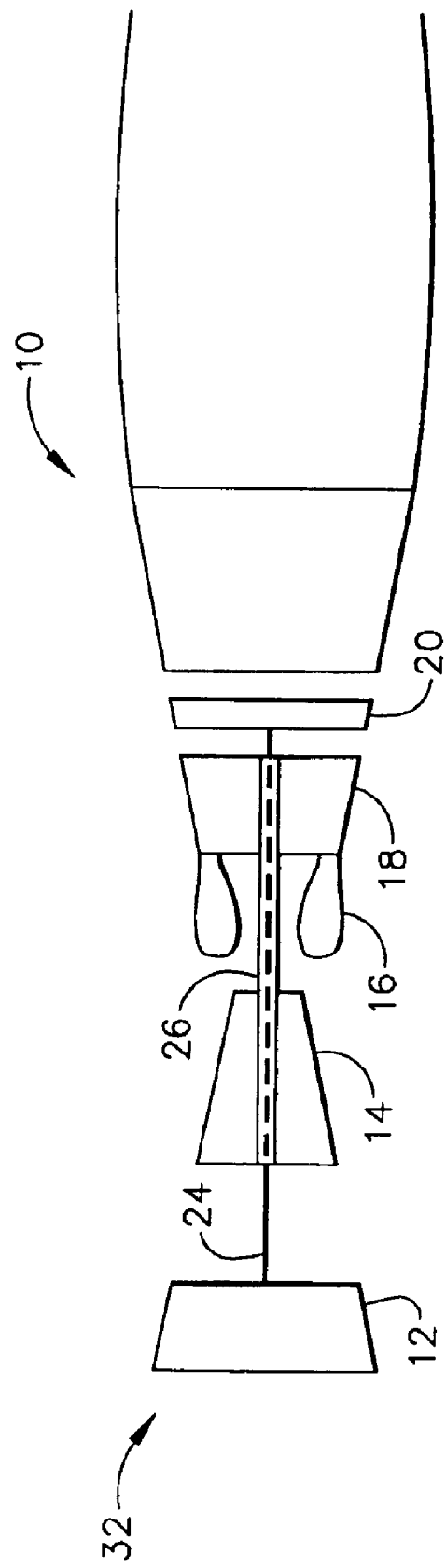
FIG. 1 is a schematic illustration of a gas turbine engine.

FIG. 1 is a schematic illustration of a gas turbine engine 10 including a low pressure compressor 12, a high pressure compressor 14, and a combustor assembly 16. Engine 10 also includes a high pressure turbine 18, and a low pressure turbine 20 arranged in a serial, axial flow relationship. Compressor 12 and turbine 20 are coupled by a first shaft 24, and compressor 14 and turbine 18 are coupled by a second shaft 26. In one embodiment, engine 10 is an GE90 engine commercially available from General Electric Company, Cincinnati, Ohio.

Figure 2:
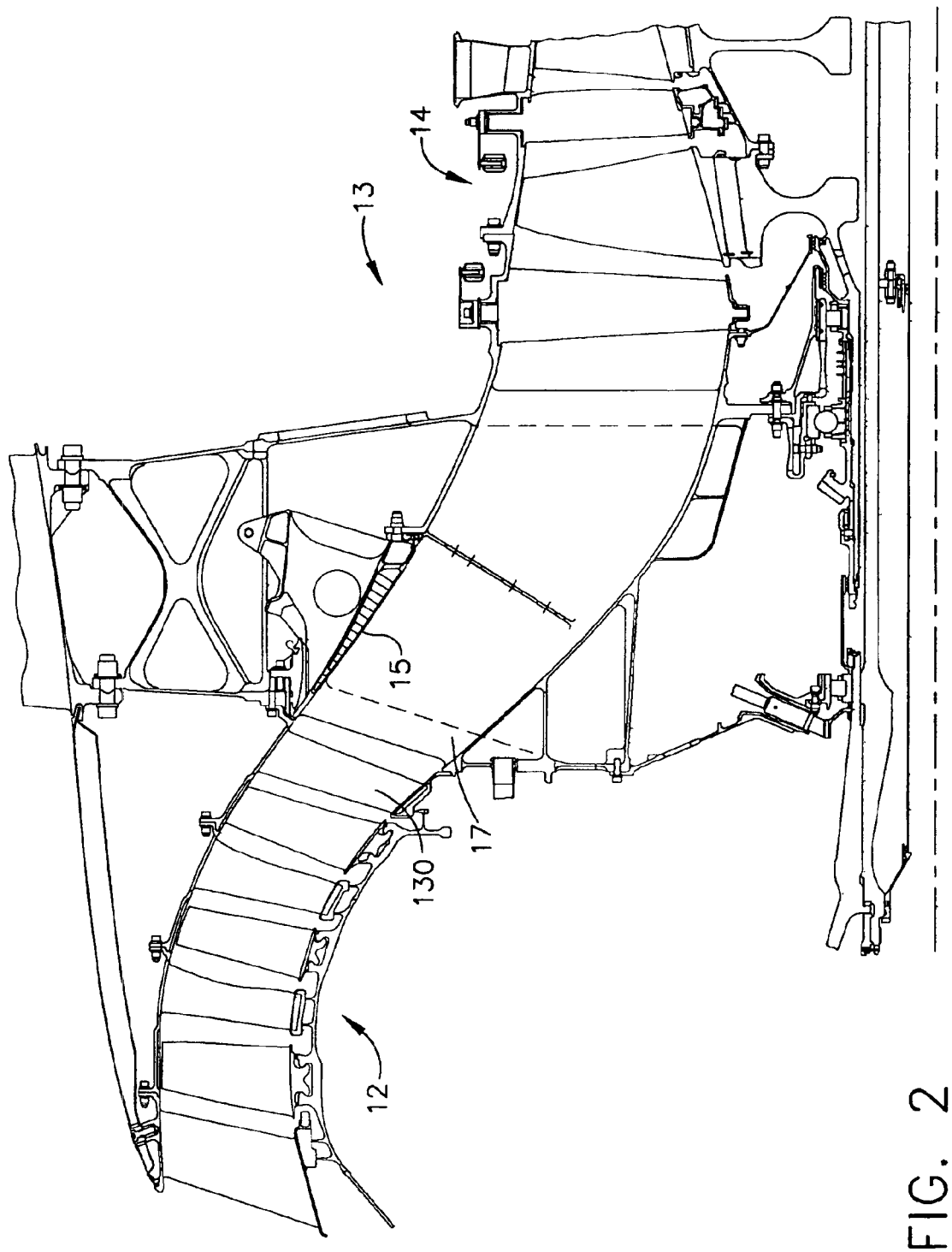
FIG. 2 is a schematic view of a booster and a core duct which includes a VBV door.

FIG. 2 shows a core duct 13 interconnecting low pressure compressor 12 and high pressure compressor 14. Core duct 13 includes a plurality of outlet guide vanes 130, a variable bleed valve door 15 through which bleed air is extracted from the gas path and a plurality of circumferentially spaced support struts 17.

In operation, air flows through low pressure compressor 12 from an upstream side 32 of engine 10 and compressed air is supplied from low pressure compressor 12 through core duct 13 to high pressure compressor 14. Compressed air is then delivered to combustor assembly 16 where it is mixed with fuel and ignited. The combustion gases are channeled from combustor 16 to drive turbines 18 and 20.

Figure 3:
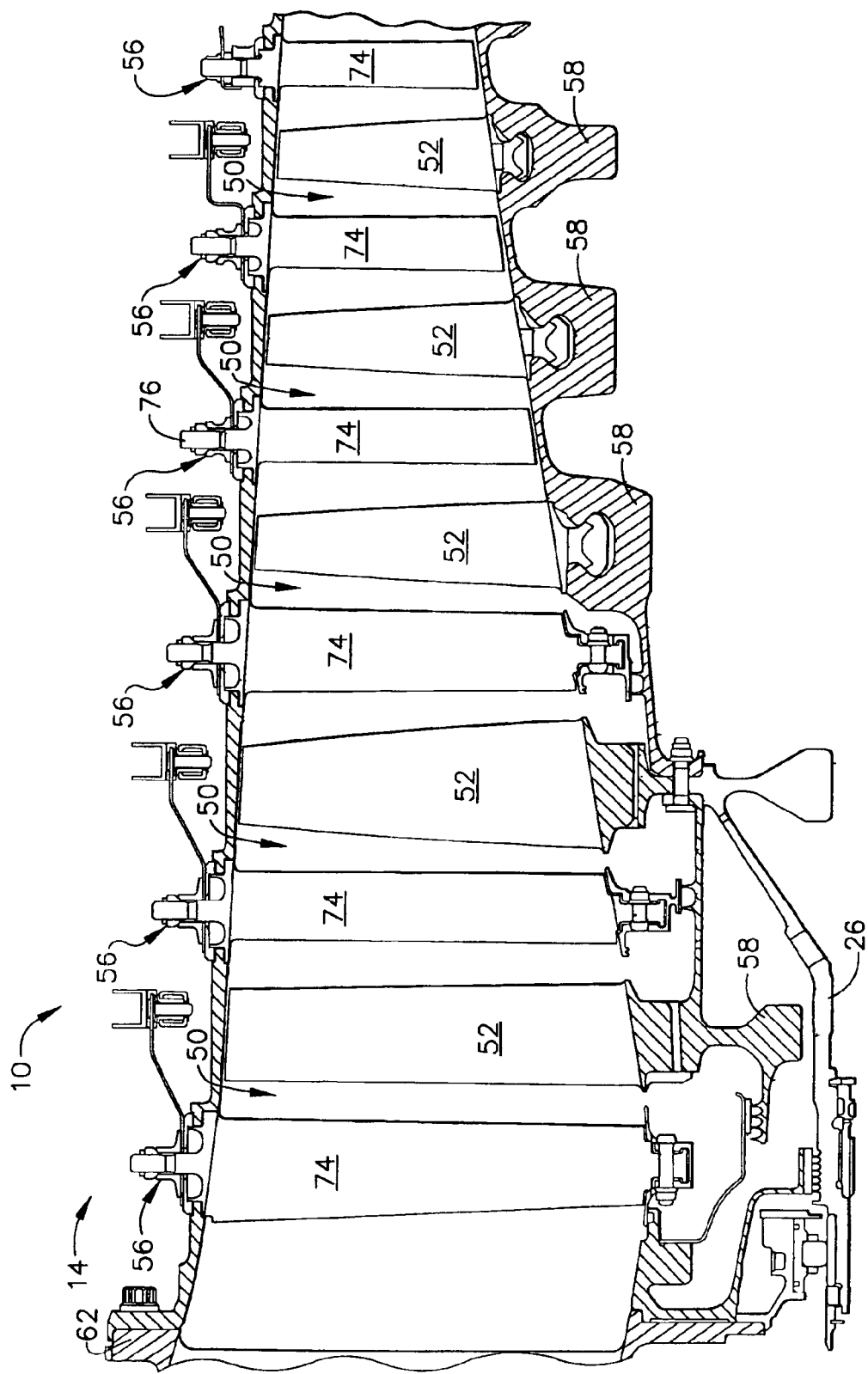
FIG. 3 is a schematic view of a portion of a high pressure compressor used with the engine shown in FIG. 1.

FIG. 3 is a schematic view of a portion of high pressure compressor 14. Compressor 14 includes a plurality of stages 50 that each include a row of rotor blades 52 and a row of stator vanes 74. Rotor blades 52 are supported by rotor disks 58, and are coupled to rotor shaft 26. Stator casing 62 extends circumferentially around rotor blades 52 and stator vane assemblies 56, such that stator vanes 74 are supported by casing 62.

Figure 4:
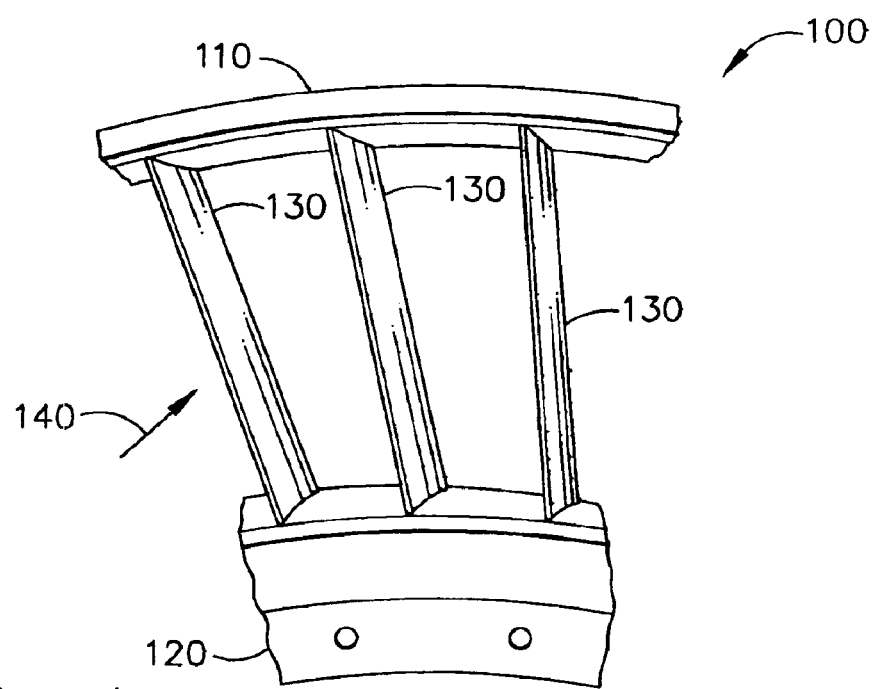
FIG. 4 is a front perspective view of a portion of an exemplary outlet guide vane assembly used with the engine shown in FIG. 1.

FIG. 4 is a front perspective view of a portion of an exemplary outlet guide vane assembly 100 used with engine 10 (shown in FIG. 1). Outlet guide vane (OGV) assembly 100 includes a plurality of outlet guide vanes 130 that extend substantially radially between upper and lower mounting flanges 110 and 120, respectively, and are circumferentially-spaced around compressor 14. In one embodiment, OGV assembly 100 is fabricated in arcuate segments in which flanges 110 and 120 are coupled to vanes 130. In another embodiment, OGV assembly 100 is formed as an integral assembly.

Figure 5:
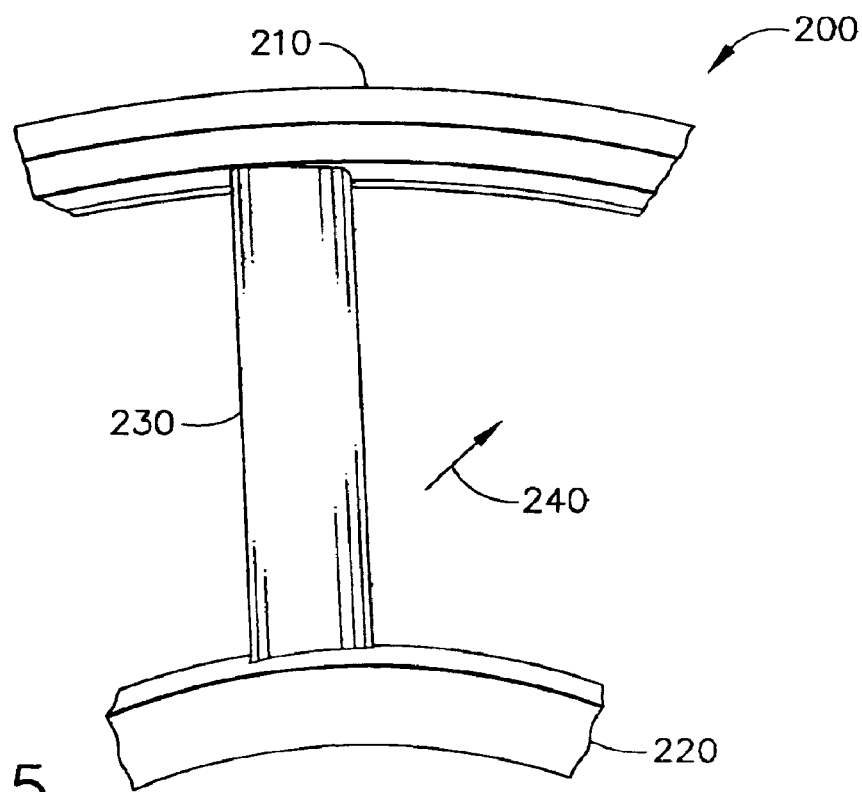
FIG. 5 is a front perspective view of a portion of an exemplary support strut assembly used with the engine shown in FIG. 1.

FIG. 5 is a front perspective view of a portion of an exemplary support strut assembly 200 used with engine 10 (shown in FIG. 1). Support strut assembly 200 includes a plurality of struts 230 extending between upper and lower mounting flanges 210 and 220, respectively. Strut assembly 200 is one of various frame and support assemblies of engine 10 that are used to facilitate maintaining an orientation of various components within engine 10. More specifically, such frame and support assemblies interconnect stationary components and provide rotor bearing supports. Support strut assembly 200 is coupled adjacent an outlet (not shown) of compressor 14 such that struts 230 are circumferentially-spaced around the outlet of compressor 14 and extend across the flow path 140 from the outlet of compressor 14. OGV assembly 100 is positioned upstream of, and is supported by, support strut assembly 200. Guide vanes 130 also extend across the flow path 140 from the outlet of compressor 14.

Figure 6:
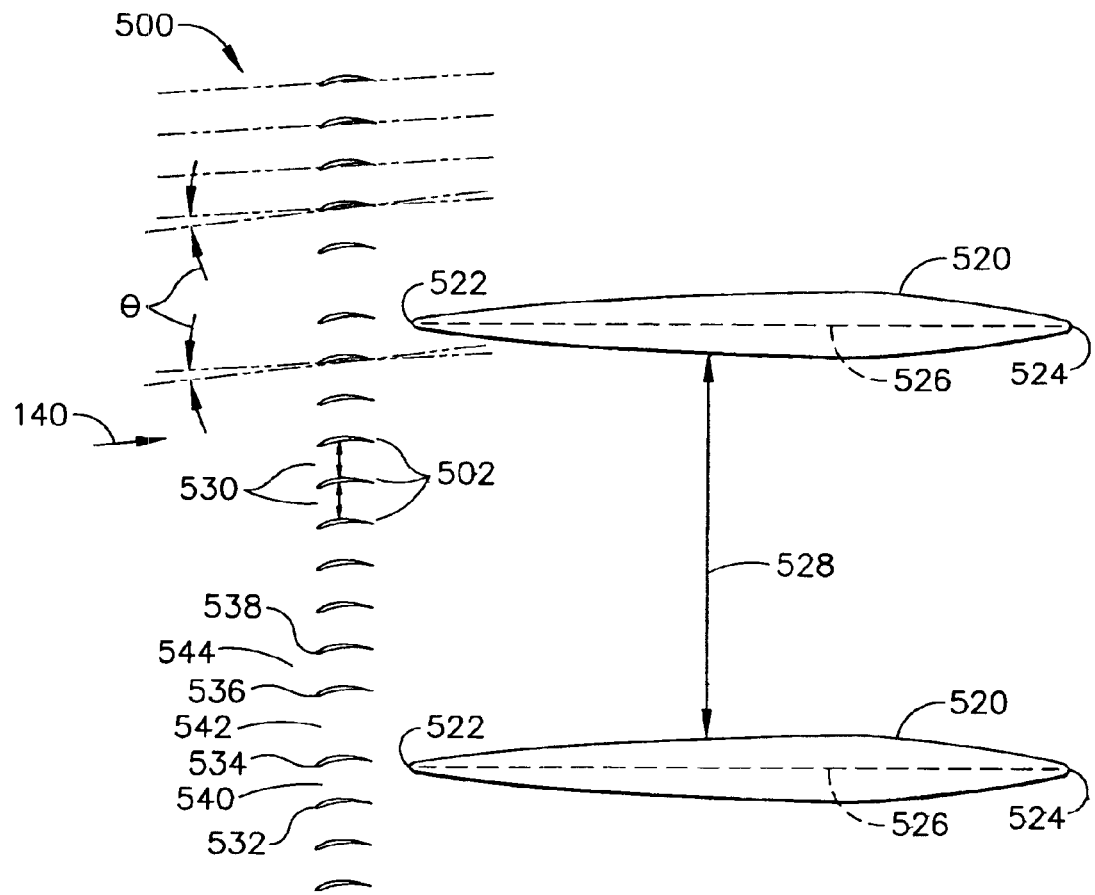
FIG. 6 is a schematic view of an outlet guide vane assembly that may be used with the engine shown in FIG. 1.
Figure 7:
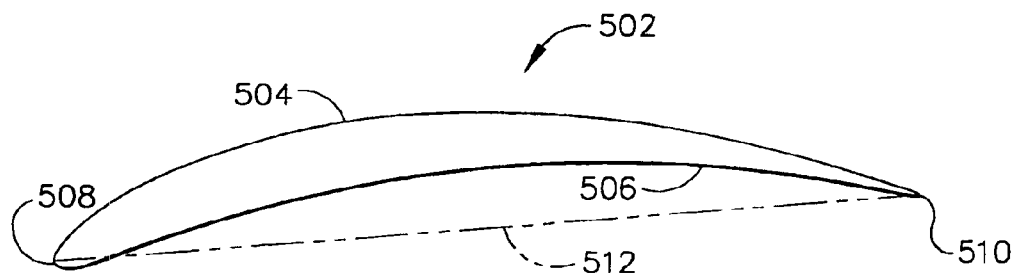
FIG. 7 is an enlarged view of a guide vane shown in FIG. 6.

FIG. 6 is a schematic view of an outlet guide vane assembly 500 that may be used with gas turbine engine 10 (shown in FIG. 1). FIG. 7 is an enlarged view of a guide vane 502 included in guide vane assembly 500. Guide vane assembly 500 includes a plurality of circumferentially-spaced guide vanes 502 extending across compressor outlet flow path 140. Each guide vane 502 includes a pair of side walls 504 and 506 joined together at a leading edge 508 and a trailing edge 510. A chord line 512 for each guide vane 502 extends between each leading and trailing edge 505 and 510, respectively.

Figure 8:
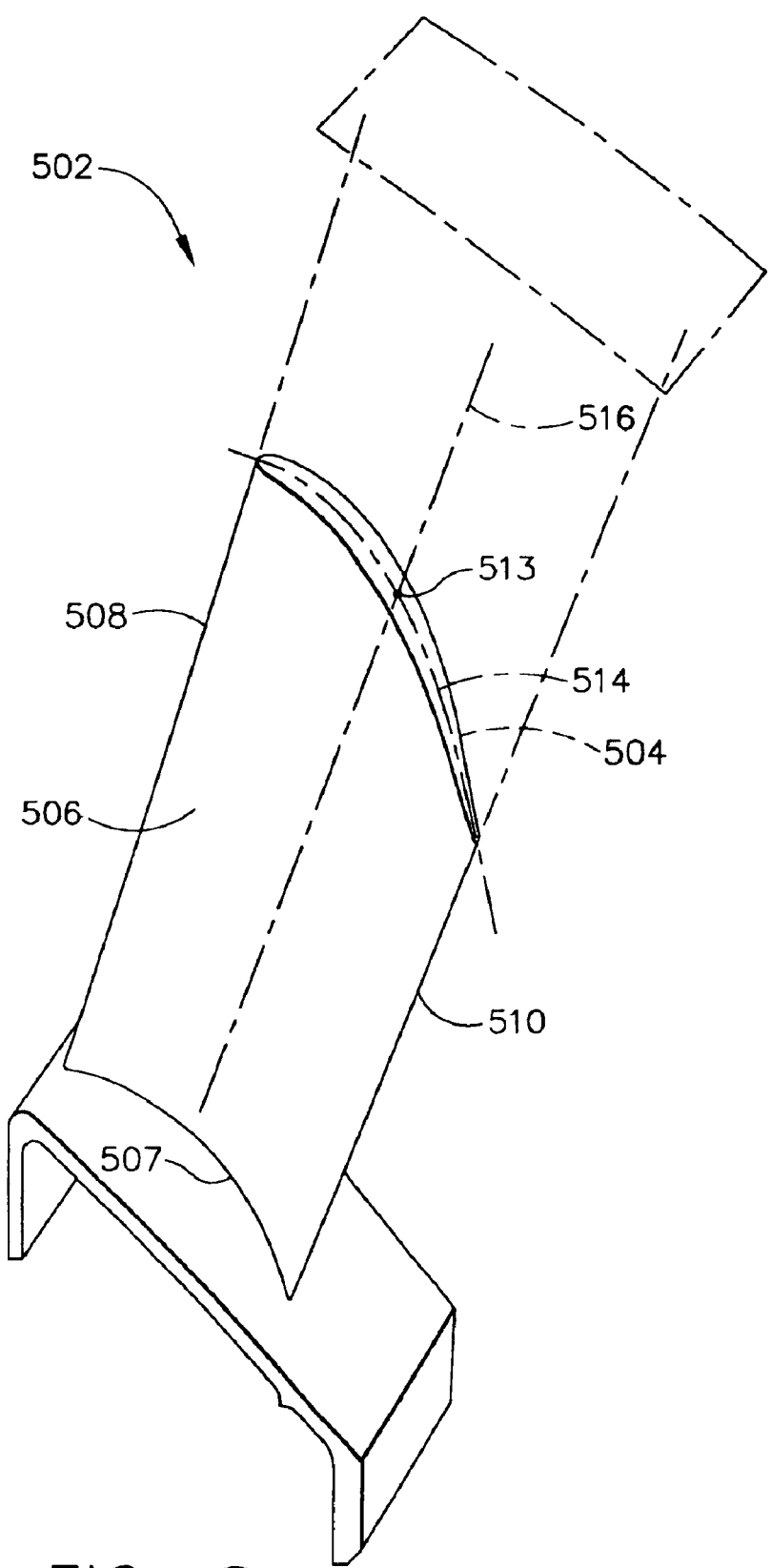
FIG. 8 is a schematic view illustrating a stacking axis of the guide vane of FIG. 7.

FIG. 8 is a schematic view of guide vane 502 illustrating a stacking axis 516. Side walls 504 and 506 extend from an inner base 507 radially outward to an outer end (not shown). The cross section shown in FIG. 7 is normal to side walls 504 and 506. At each such cross section from base 507 to the outer end of guide vane 502, a mid line 514 is defined from leading edge 508 to trailing edge 510 that divides vane substantially in half. A stacking point 513 is defined substantially halfway between leading edge 508 and trailing edge 510 along mid line 514. Stacking axis 516 extends along a line formed through stacking points 513 along a length of vane 502 from base 507 to the outer end of vane 502.

Guide vane assembly 500 is positioned within core duct 13 (shown in FIG. 2) which also includes a plurality of struts 520 extending across outlet flow path 140. Each strut 520 is coupled downstream of guide vanes 502, and each includes a leading edge 522 and a trailing edge 524. A chord line 526 for each strut 520 extends between each strut leading and trailing edge 522 and 524, respectively. More specifically, struts 520 are positioned across flow path 140 such that a circumferential spacing 528 defined between adjacent struts 520 is substantially uniform through core duct 13.

Generally, a circumferential spacing 530 defined between adjacent guide vanes 502 is substantially uniform around the guide vane assembly 500. However, immediately upstream from each respective strut 520, four adjacent guide vanes, 532, 534, 536, and 538 are coupled with non-uniform circumferential spacing and stagger, as explained in more detail below. More specifically, although guide vanes 532, 534, 536, and 538 are constructed identically to other guide vanes 502, vanes 532, 534, 536, and 538 are oriented differently than vanes 502. Specifically, a first circumferential spacing 540 defined between vanes 532 and 534 is substantially equal to uniform spacing 530. However, a second circumferential spacing 542 defined between adjacent vanes 534 and 536 is different than first circumferential spacing 540. In the exemplary embodiment, second circumferential spacing 542 is at least thirty percent wider than first circumferential spacing 540. A third circumferential spacing 544 defined between third guide vane 536 and adjacent guide vane 538 is substantially equal to first circumferential spacing 540.

Guide vanes 532, 534, 536, and 538 are also circumferentially oriented such that the stacking axis extending through second vane 534 is substantially in line in the direction of flow path 140 with a leading edge 522 of at least one of struts 520. Moreover, although guide vanes 534 and 536 are aligned substantially parallel to remaining guide vanes 502, first guide vane 532 and fourth guide vane 538 are oriented offset or staggered at an angle θ measured with respect to guide vanes 502. Accordingly, first and fourth guide vanes 532 and 538, respectively, are obliquely aligned with respect to the orientation of the remaining guide vanes 502. In one embodiment, vanes 532 and 538 are offset at an angle θ of at least about one degree. In another embodiment, first guide vane 532 is offset at an angle θ of at least about one degree negative, such that first guide vane 532 is in an orientation that is more open with respect to the flow path axis, and fourth guide vane 538 is offset at an angle θ of at least about one degree positive, such that fourth guide vane 538 is in an orientation that is more closed with respect to the flow path axis.

During operation, the increased circumferential spacing 542 between vanes 534 and 536 provides additional guidance to airflow passing each strut 520, thereby damping the pressure difference acting on either side of each strut 520. More specifically, the increased circumferential spacing 542 facilitates reducing non-uniform pressure field propagation due to vane strut coupling. In addition, as a result of the increased circumferential spacing 542, the number of vanes 502 included within assembly 500 is circumferentially reduced, thus reducing the overall weight of guide vane assembly 500. In one embodiment, over 5% fewer vanes 502 are included with guide vane assembly 500.

The above described outlet guide vane assembly provides a cost effective method for alleviating pressure field effects due to close coupling between the OGV stage and support strut assembly. The apparatus provides a substantial reduction in maximum blade stresses for the blade row immediately upstream of the vane assembly with the added benefits of improving engine performance and reducing in engine weight and cost.

Exemplary embodiments of guide vane assemblies are described above in detail. The guide vane assemblies are not limited to the specific embodiments described herein, but rather, components of each assembly may be utilized independently and separately from other components described herein. For example, each guide vane assembly component can also be used in combination with other guide vane components.

While the invention has been described in terms of various specific embodiments, those skilled in the art will recognize that the invention can be practiced with modification within the spirit and scope of the claims.

What is claimed is:

1. A method of assembling a gas turbine engine, said method comprising:

coupling an inner engine casing to an outer engine casing such that an annular flow path is defined therebetween;

coupling a plurality of circumferentially-spaced support struts between the inner and outer casings;

coupling a plurality of circumferentially-spaced outlet guide vanes within the flow path upstream from the support struts, such that a first circumferential spacing is defined between a first guide vane and a second guide vane, and a second circumferential spacing is defined between the second guide vane and a third guide vane, wherein the second guide vane is between the first and third guide vanes and wherein the second circumferential spacing is different from the first circumferential spacing; and positioning a fourth guide vane adjacent the third guide vane such that the third guide vane is between the second and fourth guide vanes, and such that the third guide vane is substantially parallel to the second guide vane, and such that the first and fourth guide vanes are obliquely aligned to the second and third guide vanes.

2. A method in accordance with claim 1 further comprising positioning the support struts such that a stacking axis extending through the second guide vane is substantially in line, in the direction of said flow path, with a leading edge of at least one support strut.

3. A method in accordance with claim 2 further comprising positioning the fourth guide vane such that a third circumferential spacing defined between the third and fourth guide vanes is substantially equal to the first circumferential spacing.

4. A method in accordance with claim 1 wherein the first and fourth guide vanes are offset at least about one degree from the third and second guide vanes.

5. A method in accordance with claim 1 wherein the second circumferential spacing is at least thirty percent wider than the first spacing.

6. A guide vane assembly for a gas turbine engine, said guide vane assembly comprising a plurality of circumferentially-spaced guide vanes comprising at least a first, a second, a third, and a fourth guide vane, said second guide vane between said first and third guide vanes, said plurality of guide vanes oriented such that a first circumferential spacing is defined between said first and second guide vanes, and a second circumferential spacing is defined between said second and third guide vanes, said second circumferential spacing is different than said first circumferential spacing, said second guide vane is substantially parallel to said third guide vane, said first and fourth guide vanes are obliquely aligned with respect to said second and third guide vanes.

7. A guide vane assembly in accordance with claim 6 further comprising a plurality of circumferentially-spaced support struts positioned downstream from said plurality of guide vanes such that a stacking axis extending through the second guide vane is substantially in line, in the direction of a flow path, with a leading edge of at least one of said plurality of struts.

8. A guide vane assembly in accordance with claim 7 further comprising said fourth guide vane being adjacent said third guide vane such that said third guide vane is between said second and said fourth guide vanes and such that a third circumferential spacing defined between said third and fourth guide vanes is substantially equal to said first circumferential spacing.

9. A guide vane assembly in accordance with claim 6 wherein said first and fourth guide vanes are offset at least about one degree from said second and third guide vanes.

10. A guide vane assembly in accordance with claim 6 wherein said second circumferential spacing is at least about thirty percent wider than said first circumferential spacing.

11. A gas turbine engine comprising:

an annular compressor discharge flow path bounded by inner and outer engine casings; and a plurality of circumferentially-spaced guide vanes disposed within said flow path, said plurality of guide vanes comprising at least a first, second, a third, and a fourth guide vane, said second guide vane positioned between said first and third guide vanes, said plurality of guide vanes oriented such that a first circumferential spacing is defined between said first and second guide vanes and a second circumferential spacing is defined between said second and third guide vanes, said second circumferential spacing is different than said first circumferential spacing, said second guide vane is substantially parallel to said third guide vane, said first and fourth guide vanes are obliquely aligned with respect to said second and third guide vanes.

12. A gas turbine engine in accordance with claim 11 further comprising a plurality of circumferentially-spaced support struts positioned downstream from said plurality of guide vanes such that a stacking axis extending through the second guide vane is substantially in line, in the direction of said flow path, with a leading edge of at least one of said plurality of struts.

13. A gas turbine engine in accordance with claim 12 further comprising said fourth guide vane being adjacent said third guide vane such that said third guide vane is between said second and fourth guide vanes and such that a third circumferential spacing defined between said third and fourth guide vanes is substantially equal to said first circumferential spacing.

14. A gas turbine engine in accordance with claim 11 wherein said first and fourth guide vanes are offset at least about one degree from said second and third guide vanes.

15. A gas turbine engine in accordance with claim 11 wherein said second circumferential spacing is at least about thirty percent wider than said first circumferential spacing.

* * * * *